United States Patent
Guerzhoy et al.

(10) Patent No.: US 8,094,971 B2
(45) Date of Patent: Jan. 10, 2012

(54) METHOD AND SYSTEM FOR AUTOMATICALLY DETERMINING THE ORIENTATION OF A DIGITAL IMAGE

(75) Inventors: Michael Guerzhoy, North York (CA); Hui Zhou, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 1161 days.

(21) Appl. No.: 11/850,383

(22) Filed: Sep. 5, 2007

(65) Prior Publication Data

US 2009/0060346 A1 Mar. 5, 2009

(51) Int. Cl.
*G06K 9/36* (2006.01)
*G01B 11/26* (2006.01)
*G01C 1/00* (2006.01)
*G01C 9/00* (2006.01)
*G01C 17/00* (2006.01)
*G01C 19/00* (2006.01)

(52) U.S. Cl. ......... 382/289; 382/287; 356/138; 702/150

(58) Field of Classification Search .................. None
See application file for complete search history.

(56) References Cited

U.S. PATENT DOCUMENTS

| | | | |
|---|---|---|---|
| 5,842,194 A * | 11/1998 | Arbuckle | 706/52 |
| 6,512,846 B1 | 1/2003 | Luo | |
| 6,915,025 B2 | 7/2005 | Wang et al. | |
| 2003/0152289 A1 | 8/2003 | Luo | |
| 2004/0151371 A1 * | 8/2004 | Chen et al. | 382/165 |
| 2005/0261573 A1 | 11/2005 | Satoh et al. | |
| 2005/0264658 A1 | 12/2005 | Ray et al. | |
| 2006/0061599 A1 * | 3/2006 | Yu et al. | 345/649 |
| 2006/0067591 A1 * | 3/2006 | Guzzwell et al. | 382/289 |
| 2006/0083441 A1 * | 4/2006 | Huang | 382/295 |

OTHER PUBLICATIONS

Talstaya "Content-based image orientation ercognition", Graphicon, Jun. 2007.*
Zhang et al. "Automatic Image Orientation Detection", IEEE Transaction on Image Processing, vol. 11, No. 7, Jul. 2002, pp. 746-755.*
Wang et al. "Image Orientation Detection with Intergrated Human Perception Cues", 2003, Processing of Int. Conf. on Image Processing, vol. 3 pp. 539-542.*
Datar et al, "Automatic Image Orientation Etection Using the Supervised Self-Organizing Map".*
Baluja et al. "Large Scale Performance Measurement of Content-based Automated Image-Orientation Detection", 2005, IEEE Int. Conf. on Image Processing col. 2, pp. 514-517.*
Zhang et al. "Boosting Image Orientation Detection with Indoor vs. Outdoor Classification", 2002, Workshop on Application of Computer Vision.*
Wang et al. "Content-based Image Orientation detection with support vector Machine", 2001, IEEE Workshop on content-based Access of Image and Video Livraries pp. 17-23.*
Luo et al. Automatic Image Orientation Detection via Confidence-based Integration of Low-Level and Semantic Cues, 2005, IEEE transaction on Pattern Analisys and Machine Intelligence vol. 27, No. 5.*
Wang et al. Detecting Image Orientation Based on -lowlwvel Visual content, 2004, computer vision and image understanding.*

(Continued)

*Primary Examiner* — Randoph I Chu
(74) *Attorney, Agent, or Firm* — Mark P. Watson

(57) ABSTRACT

A method of automatically determining orientation of a digital image comprises extracting features of the digital image and processing the extracted features using diverse classifiers to determine orientation of the digital image based on the combined output of the diverse classifiers.

25 Claims, 3 Drawing Sheets

OTHER PUBLICATIONS

Lyu "Automatic Image Orientation Determination with Natural Image Statistics", 2005, Proceeding of 13th annual ACM in Conf. on Multimedia, pp. 491-494.*

Robust Real-time Object Detection, Paul Viola and Michael Jones, Computer Science and Engineering Department, University of California, San Diego, Oct. 25, 2001, (pp. 1-12).

Adaptive Mixtures of Local Experts, Robert A. Jacobs and Michael I. Jordan, Department of Brain and Cognitive Sciences, Massachusetts Institute of Technology, Cambridge, MA, Aug. 1991, Neural Computation 3, (pp. 79-87).

Connected Components Labeling, R. Fisher, S. Perkins, A. Walker and E. Wolfart, Jan. 2003, (pp. 1-10).

* cited by examiner

METHOD AND SYSTEM FOR AUTOMATICALLY DETERMINING THE ORIENTATION OF A DIGITAL IMAGE

FIELD OF THE INVENTION

The present invention relates generally to image processing and in particular, to a method, system and computer readable medium embodying a computer program for automatically determining the orientation of a digital image.

BACKGROUND OF THE INVENTION

In electronic media management systems it is desirable to detect the orientation of consumer photographs and other images stored in digital format so that the digital images can be stored and/or retrieved in their correct orientation. Manually retrieving, viewing, and orienting large numbers of digital images is very time-consuming, and is accordingly an impractical undertaking. Not surprisingly, techniques for automatically determining orientation of digital images have been considered.

For example, U.S. Pat. No. 6,512,846 to Luo discloses a method, image recognition system and computer program for determining image orientation. Potential sky pixels in the image are classified by color and spatially contiguous regions of the potential sky pixels are identified. Actual sky regions are identified by eliminating ones of the spatially contiguous regions that have a texture above a predetermined texture threshold and desaturation gradients of the actual sky regions are computed. The image is classified as one of portrait and landscape based on average absolute values of horizontal and vertical desaturation gradients of pixels within each of the actual sky regions. Orientation of the image is determined based on a polarity of the average horizontal and vertical desaturation gradients, and the actual sky regions are confirmed as true sky regions by comparing the desaturation gradients with a predetermined desaturation gradient for sky.

U.S. Pat. No. 5,842,194 to Arbuckle discloses a system comprising a neural network, or computer, for implementing a feature detection and a statistical procedure, and fuzzy logic for solving the problem of recognition of faces or other objects at multiple resolutions. A plurality of systems for recognizing faces (or other objects) which use local autocorrelation coefficients and linear discriminant analysis are trained on a data set to recognize facial images each at a particular resolution. In a second training stage, each of the systems is tested on a second training set in which the images presented to the recognition systems have a matching resolution to those of the first training set. The statistical performance of the second training stage is used to train a fuzzy combination technique, that of fuzzy integrals. In a test stage, the results from the classifiers at the multiple resolutions are combined using fuzzy combination to produce an aggregated system whose performance is higher than that of any of the individual systems.

U.S. Pat. No. 6,915,025 to Wang et al. discloses arrangements and procedures for identifying an image's orientation by extracting features from peripheral portions of the image. The procedure evaluates the extracted features based on training image feature orientation classification models to identify the image's orientation.

U.S. Patent Application Publication No. 2003/0152289 to Luo discloses a method for determining the orientation of a digital image. A semantic object detection method is employed to detect the presence and orientation of a semantic object. A scene layout detection method is employed to detect the orientation of a scene layout. An arbitration method is employed to produce an estimate of the image orientation from the orientation of the detected semantic object and the detected orientation of the scene layout.

U.S. Patent Application Publication No. 2004/0151371 to Chen et al. discloses a digital image processing method for determining an orientation of a face in a digital color image which generates a mean grid pattern element image from a plurality of sample face images and an integral image from the digital color image. A face is located in the color digital image by using the integral image to perform a correlation test between the mean grid pattern element image and the digital color image at a plurality of effective resolutions. The digital color image is reduced to a plurality of grid pattern element images at different effective resolutions and the mean grid pattern element image is correlated with the plurality of grid pattern element images. Either the mean grid pattern element image or the grid pattern element images are provided at a plurality of different orientations. The orientation of the face in the color digital image is determined by using the images with different orientations in the correlation test.

U.S. Patent Application Publication No. 2005/0261573 to Satoh et al. discloses an index detector which detects image coordinates of indices arranged on a scene from an image shot by an imaging device. An orientation sensor is attached to the imaging device, and outputs a measured orientation. An orientation prediction unit predicts an orientation of the imaging device on the basis of the measured orientation obtained by the orientation sensor. A position/orientation calculator receives the predicted orientation of the imaging device and a set of the image coordinates and world coordinates of each index, determines the position of the imaging device and an update value for an azimuth-drift-error correction value of the orientation sensor, and calculates the position and orientation of the imaging device.

U.S. Patent Application Publication No. 2005/0264658 to Ray et al. discloses a method for determining the presence of a face from image data which utilizes at least two algorithms. The first algorithm prescreens the image data by determining a plurality of face candidates utilizing a pattern matching technique that identifies image windows likely to contain faces based on color and shape information. The second algorithm processes the face candidates determined by the first algorithm, and uses a posterior probability function classifier to determine the presence of the face.

U.S. Patent Application Publication No. 2006/0083441 to Huang discloses a method for re-orientating digital images in an image-editing environment, where images are loaded in a landscape mode by default, with the aim of unburdening users from the inconvenience of manual correction of image orientation. Intelligent re-orientation of digital images is realized by analyzing an image in order to determine if re-orientation is required. This is accomplished in one embodiment by using image zone analysis processes and facial feature analysis.

U.S. Patent Application Publication No. 2006/0061599 to Yu et al. discloses (i) systems and methods for visually rendering images at a time of display based on annotations indicating needed rotations; (ii) systems and methods for visually rendering images at a time of display by determining a needed rotation for an image based on automatic orientation recognition; (iii) systems and methods for visually rendering images at a time of display by utilizing fuzzy logic to determine a best rotation angle for an image based on a non-precise marking generated by computer vision or signal processing applied to the image; and (iv) systems and methods for annotating images at the time of image capture, the time of image display, or any time in between by using one or more of automatic image orientation recognition, user input specifying a needed rotation, and sensed orientation of an image capture mechanism.

U.S. Patent Application Publication No. 2006/0067591 to Guzzwell et al. discloses a method, system and computer program product for identifying an orientation of an image having a plurality of features. The method comprises the steps of defining a plurality of feature kinds, wherein each feature in the plurality of features corresponds to an associated feature kind in the plurality of feature kinds and providing a feature kind classification order for ordering the plurality of feature kinds. The method also comprises searching the image to identify a feature set in the plurality of features in the image based on the feature kind classification order, wherein the feature set comprises at least one feature and each feature in the feature set corresponds to a defining feature kind. The feature set is classified to determine the orientation of the image.

Although the above references disclose techniques for orienting digital images, improvements are desired. It is therefore an object of the present invention to provide a novel method, system and computer readable medium embodying a computer program for automatically determining the orientation of a digital image.

SUMMARY OF THE INVENTION

According to an aspect, there is provided a method of automatically determining orientation of a digital image comprising:
  extracting features of the digital image; and
  processing the extracted features using diverse classifiers to determine orientation of the digital image based on the combined output of the diverse classifiers.

In one embodiment, the extracted features comprise high level features and low level features. The low level features may represent at least two of color coherence vectors, color moments, edge direction histograms and edge direction coherence vectors. The high level features comprise face-like features.

In one embodiment, the diverse classifiers comprise backpropagation neural network classifiers and mixture of experts network classifiers. The mixture of experts network classifiers comprise a gating network and a plurality of expert networks.

According to another aspect, there is provided a system for automatically determining the orientation of a digital image comprising:
  a feature extractor extracting features of the digital image; and
  a processing network processing the extracted features using diverse classifiers to determine orientation of the digital image based on the combined output of the diverse classifiers.

According to yet another aspect, there is provided a computer readable medium having a computer program thereon for automatically determining the orientation of a digital image, the computer program comprising:
  computer program code extracting features of the digital image; and
  computer program code processing the extracted features using diverse classifiers to determine orientation of the digital image based on the combined output of the diverse classifiers.

The method, system and computer readable medium embodying a computer program for automatically determining the orientation of a digital input image described herein is robust, and uses computational and memory resources efficiently. The use of color coherence vector (CCV) and edge direction coherence vector (EDCV) low-level features in digital input image orientation determination provides a statistically significant improvement in the results. Furthermore, extraction of the low-level features from the digital input image is conducted in a more resource-efficient manner than has been done previously.

Use of the YIQ color space provides increased performance over prior art methods that employ the YUV color space, due to the fact that YIQ color space is a linear transformation of the RGB color space in which the digital input images are typically stored.

BRIEF DESCRIPTION OF THE DRAWINGS

Embodiments will now be described more fully with reference to the accompanying drawings in which.

DETAILED DESCRIPTION OF THE EMBODIMENTS

Figure 1:
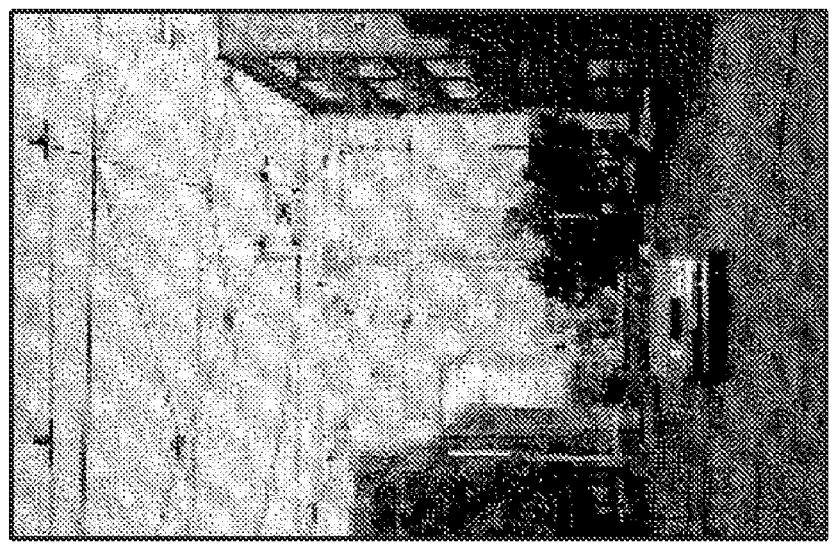
FIG. 1 shows a digital image oriented with its top edge facing the 270 degree or "West" direction.

In the following description, an embodiment of a method, computer readable medium and system for automatically determining the orientation of a digital input image is provided. Digital input images may be properly oriented with their top edges facing the 0 degree or "North" direction or improperly oriented with their top edges facing one of the 90 degree or "East" direction, the 180 degree or "South" direction or the 270 degree or "West" direction. For example, FIG. 1 shows a digital input image oriented with its top edge facing the 270 degree or West direction. During the digital input image orientation determination method, features are extracted from each digital input image and processed using diverse classifiers to determine orientation of the digital input image based on the combined output of the diverse classifiers. The determined orientation information can be used to determine how much rotation of the digital input image is required in order to reorient the digital input image such that its top edge faces the 0 degree or North direction. In this manner, digital input images that are not upright can be detected allowing them to be reoriented for ease of viewing.

Figure 2:
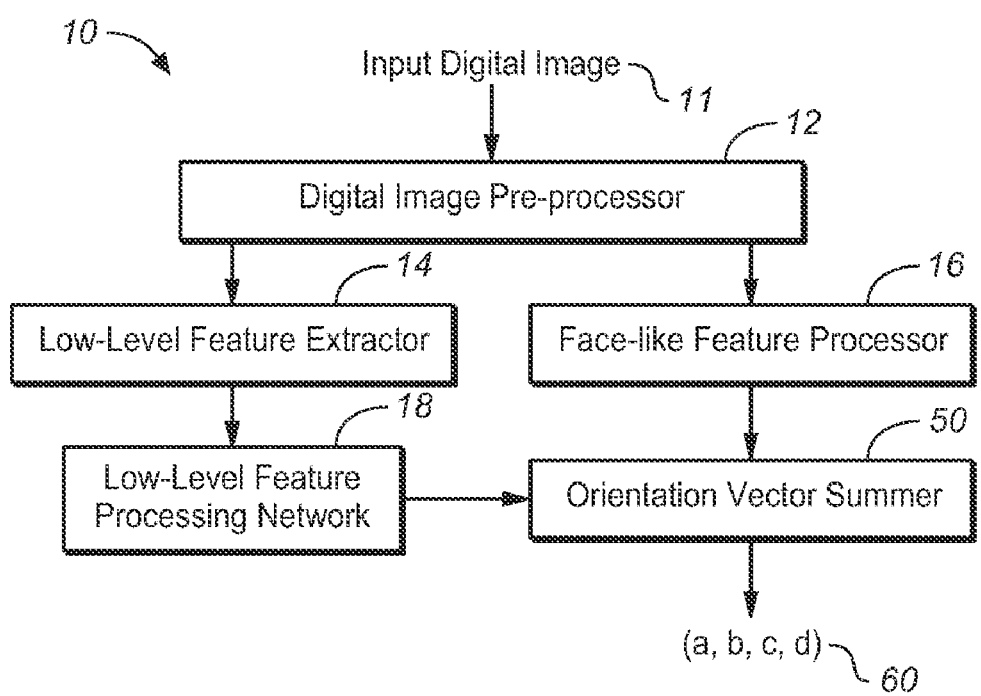
FIG. 2 is a block diagram of a system for automatically determining the orientation of a digital input image.

Turning now to FIG. 2, a system for automatically determining the orientation of a digital input image is shown and is generally identified by reference numeral 10. In this embodiment, the system 10 comprises a digital input image preprocessor 12, a low-level feature extractor 14 coupled to the pre-processor 12, a low-level feature processing network 18 coupled to the low-level feature extractor 14, a face-like feature processor 16 coupled to the pre-processor 12 and an orientation vector summer 50 coupled to both the low-level feature processing network 18 and the face-like feature processor 16.

The pre-processor 12 comprises a single and computationally inexpensive linear RGB to YIQ color space transformation function and generates a set of four (4) YIQ images for each digital input image. The YIQ images are applied to both the low-level feature extractor 14 and the face-like feature processor 16. In response to receiving the YIQ images, the low-level feature extractor 14 extracts a plurality of low-level features from the YIQ images, namely edge direction histograms (EDHs), color moments (CMs), color coherence vectors (CCVs) and edge direction coherence vectors (EDVCs). The extracted low-level features are provided to the low-level feature processing network 18, which in turn processes the extracted low-level features and generates low-level feature orientation vectors. In response to receiving the YIQ images, the face-like feature processor 16 generates high-level features, namely face-like feature orientation vectors via a cascade of classifiers that use Haar wavelet-like features selected by Adaboost as described in the publication entitled "Robust real-Time Object Detection", Second International Workshop on Statistical and Computerized Theories of Vision-Modeling, Learning, Computing and Sampling; Vancouver, Canada July 2001. The orientation vector summer 50 receives the low-level feature orientation vectors from the low-level feature processing network 18 and the face-like feature orientation vectors from the face-like feature processor 16 and generates an output orientation vector 60 for each digital input image.

Orientation vector 60 has four (4) components labelled a to d, with each component corresponding to a respective one of the North (0 degrees), East (90 degrees), South (180 degrees) and West (270 degrees) digital input image orientations. Component a of the orientation vector 60 is associated with the zero degree or North top edge orientation, component b is associated with the 90° or East top edge orientation, component c is associated with the 180° or South top edge orientation and component d is associated with the 270° or West top edge orientation. If component a of the orientation vector 60 has the highest value, the digital input image is deemed to be upright and properly oriented. If one of components b to d of the orientation vector 60 has the highest value, the digital input image is deemed to be improperly oriented. The orientation vector 60 in this case can be applied to a rotation module (not shown) allowing the rotation module to rotate digital input image by the appropriate amount so that the top edge of the digital input image assumes the 0 degree or North position.

Figure 3:
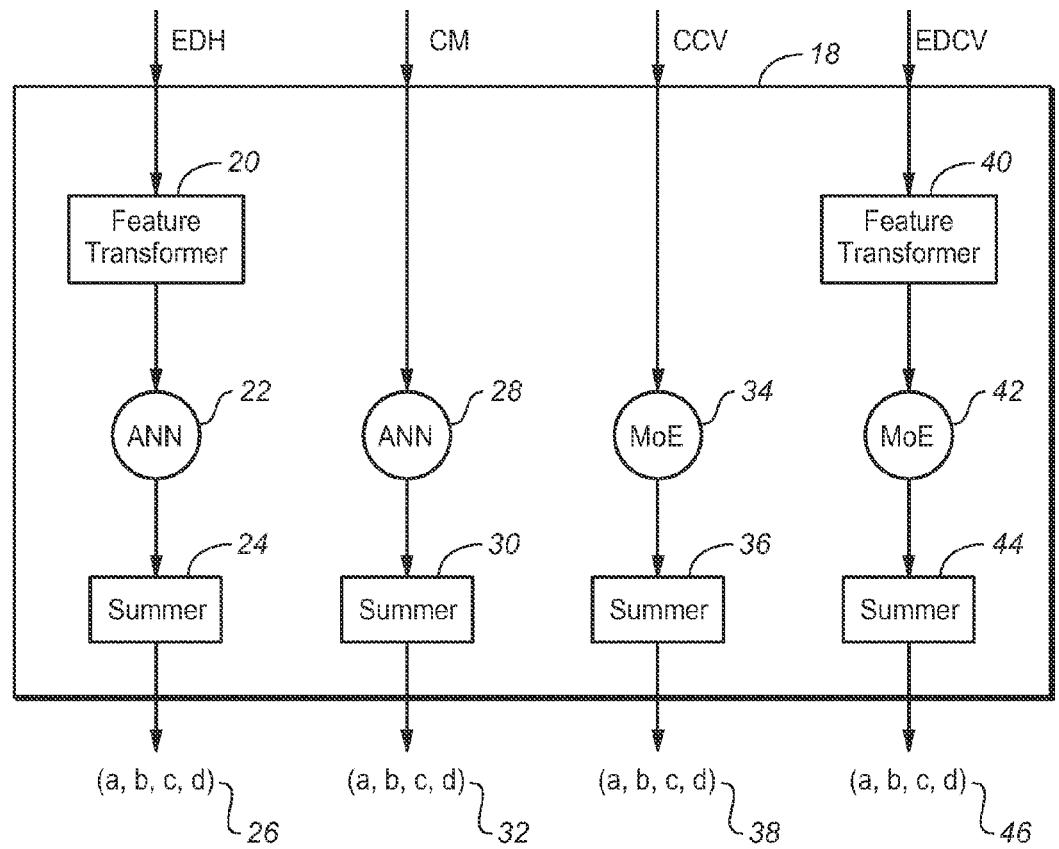
FIG. 3 is a block diagram of a low-level feature processing network forming part of the system of FIG. 2.

FIG. 3 is a block diagram of the low-level feature processing network 18. As can be seen, the low-level feature processing network 18 receives the low-level features comprising edge direction histograms (EDHs), color moments (CMs), color coherence vectors (CCVs) and edge direction coherence vectors (EDCVs) from the low-level feature extractor 14 and processes the low-level features along parallel paths as will now be described.

One path of the low-level feature processing network 18 comprises a feature transformer 20 and a single hidden-layer backpropagation artificial neural network (ANN) 22 coupled to the feature transformer 20. The ANN 22 has sixty (60) hidden units. The ANN 22 receives as input each EDH, and outputs a respective EDH-based orientation vector $OV_{EDH}$. The EDH-based orientation vector $OV_{EDH}$ has four (4) components, one component for each of the possible 0, 90, 180 and 270 degree top edge orientations. The values assigned to the components of the EDH-based orientation vector $OV_{EDH}$ indicate the degrees to which the ANN 22 believes, based on its respective input EDH, the top edge of the digital input image is facing each of the four possible directions. For example, an EDH-based orientation vector $OV_{EDH}$=(0.6, 12.0, 0.8, 0.65), indicates that the ANN 22 believes to a high degree as compared to the other possible directions the top edge of the digital input image is facing the East or 90 degree direction. The ANN 22 thus acts as an orientation classifier. A summer 24 communicates with the ANN 22 and sums the EDH-based orientation vectors $OV_{EDHs}$ output by the ANN 22 as will be described, to result in a composite EDH-based orientation vector 26.

A second path of the low-level feature processing network 18 comprises a second single hidden-layer backpropagation artificial neural network (ANN) 28. The ANN 28 has eighty (80) hidden units. The ANN 28 receives as input each CM and outputs a respective CM-based orientation vector $OV_{CM}$. Like the EDH-based orientation vector, each CM-based orientation vector $OV_{CM}$ has four (4) components, one component for each of the possible 0, 90, 180 and 270 degree top edge orientations. Also like the EDH-based orientation vector, the values assigned to the components of the CM-based orientation vector $OV_{CM}$ indicate the degrees to which the ANN 28 believes, based on its respective input CM, the top edge of the digital input image is facing each of the four possible directions. A summer 30 communicates with the ANN 28 and sums the CM-based orientation vectors $OV_{CMs}$ output by the ANN 28 as will be described, to result in a composite CM-based orientation vector 32.

A third path of the low-level feature processing network 18 comprises a mixture of experts network (MOE) 34. The MOE 34 includes a gating network with sixty (60) hidden units, and ten (10) expert networks each having sixty (60) hidden units. The MOE 34 receives as input each CCV and outputs a respective CCV-based orientation vector $OV_{CCV}$. Like the orientation vectors described above, each CCV-based orientation vector has four (4) components, one component for each of the possible 0, 90, 180 and 270 degree top edge orientations. Also like each of the orientation vectors described above, the values assigned to the components of the CCV-based orientation vector $OV_{CCV}$ indicate the degrees to which the MOE 34 believes, based on its respective input CCV, the top edge of the digital input image is facing each of the four possible directions. A summer 36 communicates with the MOE 34 and sums the CCV-based orientation vectors $OV_{CCVs}$ output by the MOE 34 as will be described, to result in a composite CCV-based orientation vector 38.

A fourth path of the low-level feature processing network 18 comprises a feature transformer 40 and a mixture of experts network (MOE) 42 that communicates with the feature transformer 40. The MOE 42 includes a gating network with sixty (60) hidden units, and ten (10) expert networks each having sixty (60) hidden units. The MOE 42 receives as input each EDCV and outputs a respective EDCV-based orientation vector $OV_{EDCV}$. Like the orientation vectors described above, each EDCV-based orientation vector has four (4) components, one component for each of the possible 0, 90, 180 and 270 degree top edge orientations. Also like each of the orientation vectors described above, the values assigned to the components of the EDCV-based orientation vector $OV_{EDCV}$ indicate the degrees to which the MOE 42 believes, based on its respective input EDCV, the top edge of the digital input image is facing each of the four possible directions. A summer 44 communicates with the MOE 42 and sums the EDCV-based orientation vectors $OV_{EDCVs}$ output by the MOE 42 as will be described, to result in a composite EDCV-based orientation vector 46.

As will be recognized, the low-level feature processing network 18 includes a plurality of diverse classifiers for generating the composite EDH-based orientation vectors, the composite CM-based orientation vectors, the composite CCV-based orientation vectors and the composite EDCV-based orientation vectors. These composite orientation vectors together with the orientation vector output of the face-like feature processor 16 are applied to the orientation vector summer 50, which sums the received orientation vectors to yield the resultant orientation vector 60.

Figure 4:
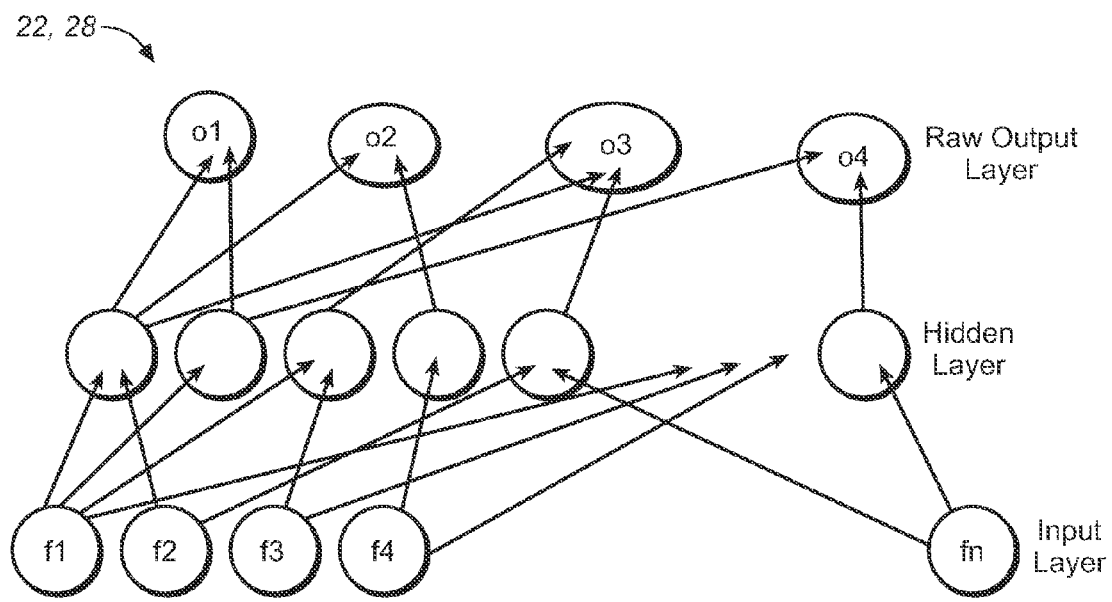
FIG. 4 is a block diagram of an artificial neural network in the low-level feature processing network of FIG. 3.

FIG. 4 is a diagram illustrating the general structure of the ANN 22 and ANN 28. The input layer of the ANN is fully connected to the hidden layer, and the hidden layer is fully connected to the raw output layer. The output of each unit in the input layer is simply the value of the feature put into it. The output of each unit in both the hidden layer and the raw output layer is the standard output of a sigmoid unit, according to Equation 1 below:

$$y = \text{sigmoid}\left(b + \sum_{i=1}^{n} w_i x_i\right) \quad (1)$$

where:

$$\text{sigmoid}(x) = \frac{1}{1 + \exp(-x)};$$

b is the bias of the unit;
$\{w_1, \ldots, w_n\}$ are the weights associated with the units in the hidden layer; and
$\{x_1, \ldots, x_n\}$ are the activities of the units in the hidden layer.

Each of the possible digital input image orientations {North, East, South, West}, (or {0, 90, 180, 270}) is assigned to a respective one of four (4) output units $\{O_1, O_2, O_3, O_4\}$ of the ANN. More particularly, $O_1$ represents the degree to which the ANN believes the top edge of the image faces North, $O_2$ represents the degree to which the ANN believes the top edge of the image faces East, $O_3$ represents the degree to which the ANN believes the top edge of the image faces South, and $O_4$ represents the degree to which the ANN believes the top edge of the image faces West.

The outputs from the four output units $\{O_1, O_2, O_3, O_4\}$ are normalized such that $O_1+O_2+O_3+O_4=1$, so as to permit them to represent probabilities that the top edge of the digital input image 11 is facing a particular direction.

In this embodiment, the MOE 34 and MOE 42 are mixture of experts networks, as set out in the publication entitled "Adaptive Mixtures of Local Experts," R. A. Jacobs, M. I. Jordan, S. J. Nowlan, G. E. Hinton, *Neural Computation* 3, 79-87(1991). The MOE networks 34, 42 each comprise a Softmax network for the gating network, and several regular expert networks.

To obtain the output of the Softmax network, the raw output unit values are normalized according to Equation 2 below:

$$\vec{O} = \left\{\frac{e^{O_1}}{x}, \frac{e^{O_2}}{x}, \frac{e^{O_3}}{x}, \frac{e^{O_4}}{x}\right\} \quad (2)$$

where:

$$x = e^{O_1} + e^{O_2} + e^{O_3} + e^{O_4}$$

During training of the MOE 34 and MOE 42, each expert network and the gating network are provided with training data. The error function shown in Equation 3, below, is then minimized:

$$E = -\log \sum_i p_i \exp\left(-\frac{1}{2}\|d - o_i\|^2\right) \quad (3)$$

where:

$$p_i = \frac{e^{o_i}}{\sum_j e^{o_j}}$$

This method of training is preferable to the known technique of bagging since the combination coefficients are adaptive. Furthermore, different expert networks may better specialize in respective types of digital input images, with the gating network arbitrating which expert network is likely to best classify a given digital input image. For example, one or a subset of expert networks may specialize in dark digital input images (for example, digital input images that are likely to be photographs taken in low-light or during the night), while another one or subset of expert networks may specialize in light-blue photographs (for example, digital input images that are likely to be landscape photographs).

During training of the ANN 22 and ANN 28, backpropagation with adaptive learning rates is used to learn the classifier function, whereby each classifier is trained using the stochastic gradient descent method. That is, training samples are fed into the backpropagation network in a random order, and errors are propagated back through the network to adjust the weights as described above. A validation set is maintained, and not used for training, in order to estimate the expected error. The error on the validation set is periodically computed and a "snapshot" of the network is taken. When it is determined that the error on the validation set has reached a global minimum, the snapshot of the network having the smallest error is selected for use in determining orientation of digital input images.

Figure 5:
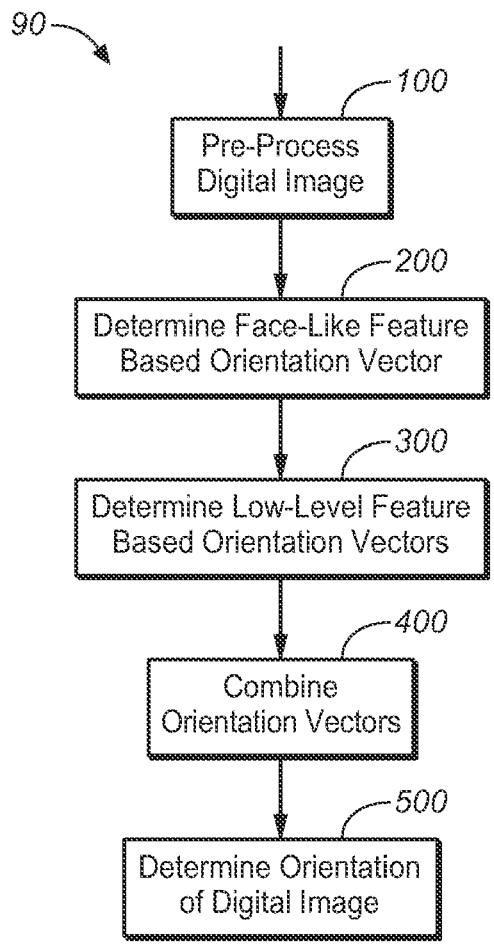
FIG. 5 is a flowchart showing steps performed by the system of FIG. 2 during digital input image orientation determination.

FIG. 5 is a flowchart showing steps performed by the system 10 during digital input image orientation determination. When a digital input image is received by the system 10, the digital input image is firstly pre-processed (step 100) by pre-processor 12. As mentioned previously, during pre-processing the digital input image is converted to a YIQ image using the linear RGB to YIQ color space transformation function. Three additional copies of the YIQ image rotated respectively, by 90, 180 and 270 degrees are also generated thereby to yield a set of four (4) YIQ images.

After pre-processing the four YIQ images are fed to the face-like feature processor 16, which processes the YIQ images to detect high-level features i.e. faces therein. Face-like feature processor 16 detects the high-level face-like features in a similar manner to the visual object detection framework described in the publication entitles "Robust Real-time Object Detection," P. Viola and M. Jones, Second International Workshop on Statistical and Computational Theories of Vision—Modeling, Learning, Computing, and Sampling, Vancouver, Canada, July 2001, the content of which is incorporated herein by reference. During execution of the method, a cascade of sliding windows of various sizes is employed to determine whether face-like features can be found within the windows. If a window having a given size and position is determined to include a face-like feature, a match is recorded. Based on the premise that the classifiers are trained for a small degree of translation invariance, the number of face detections with similarly-sized windows, and proximity of face detections can be used as a confidence score. While the Viola et al. method provides high detection rates and rapid processing, it has been found that for the purpose of digital input image orientation determination, results from a small subset of the number of differently sized windows proposed by Viola et al. are sufficient. Though results are less precise when taken alone, the results are obtained faster and with lower memory and processing requirements and, when combined with the results from the low-level feature processor 18 provide very good results for digital input image orientation determination.

The cascade of classifiers in the face-like feature processor 16 processes each of the four (4) YIQ images in the set, and identifies the number of face-like features in each of the YIQ images. The identified face-like features for each of the four (4) possible digital input image orientations are then aggregated to form the face-like feature orientation vector. The face-like feature orientation vector represents in which of the four (4) directions the face-like feature processor 16 believes the top edge of the digital input image is oriented. For example, a face-like feature orientation vector $OV_{FLF}$=(2, 12, 1, 0), where each component represents 0, 90, 180 and 270 degrees, respectively, indicates a belief by the face-like feature processor 16 to a high degree that the top edge of the digital input image is facing East (or 90 degrees). As will be appreciated, generation of the face-like feature orientation vector is based on the premise that faces in a digital input image are usually upright when the image is oriented correctly such that the direction corresponding to the highest number of face-like features is deemed to correspond to the top edge of the digital input image.

Figure 6:
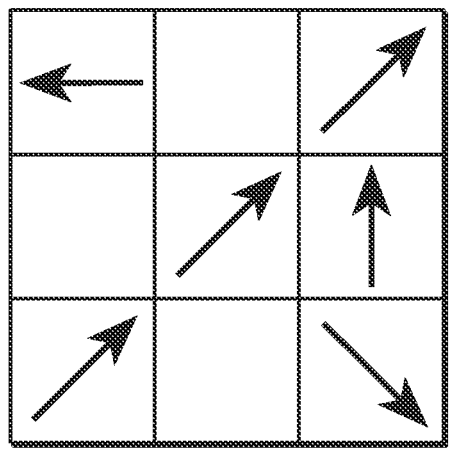
FIG. 6 is a 3×3 pixel block extracted from a YIQ image showing quantized edge direction of each pixel therein.

After pre-processing the four YIQ images are also fed to the low-level feature extractor 14 (step 300). The low-level feature extractor 14 in response extracts low-level features from the YIQ images, namely edge direction histograms (EDHs), color moments (CMs), color coherence vectors (CCVs), and edge direction coherence vectors (EDCVs). In order to extract the EDHs and CMs, each of the YIQ images is divided into a grid of between 50 and 100 equal-sized rectangular regions. An EDH is extracted, using the well-known non-maximum suppression technique, from each rectangular region using only Y-channel pixel values. Each EDH includes sixteen (16) edge direction bins, and one (1) no-direction bin, totalling seventeen (17) bins, such that edges are quantized into sixteen directions. It will be understood that the no-direction bin is allocated to pixels whose edge direction has been "pruned" by the non-maximum suppression. FIG. 6 is a three by three pixel block extracted from a rectangular region of a YIQ image, showing the quantized edge directions for the pixels that are used to generate the edge direction histogram. Pixels having no direction arrow represent a no-direction evaluation.

Mean and variance CMs are computed for each of the Y, I and Q color components, for each rectangular region. Each of the CMs is then normalized, yielding values roughly between zero (0) and one (1). Normalized values are calculated according to Equation 4, below:

$$f_i = \frac{f_i - \min(f_i)}{\max(f_i) - \min(f_i)} \quad (4)$$

where:
$\min(f_i)$ and $\max(f_i)$ are taken over the whole training set.

Three color coherence vectors (CCVs) are extracted from each of the YIQ images in the set, one for each of the Y, I and Q color components. During the extraction, each pixel is compared to adjacent pixels, and a CCV is populated based on the color coherence of each pixel to its adjacent pixels.

More particularly, each of the Y, I and Q color components in a YIQ image is quantized into eight (8) buckets of color values, and connected component labels are assigned to pixels in the first row of the YIQ image based on the buckets with which they are associated (i.e., the bucket within which the value of that pixel falls). Connected component labels are then assigned to pixels during a scan of subsequent rows based on respective color connections to one of the four neighboring, previously-scanned pixels (as opposed to all eight of the neighboring pixels, four of which have not yet been scanned, as is known). A color connection is considered to occur when at least one of the four neighboring, previously-scanned pixels is in the same color bucket as the current pixel. In the event that a color connection is identified, the size of the corresponding connected component is increased by one (1). Otherwise, the pixel is considered to be a new component, and therefore is assigned a new component label with an initial component size equal to one (1) pixel. If only one (1) previously-scanned neighbour has the same color bucket, the label of the one (1) neighbour is assigned to the current pixel and its component size is incremented by one (1). If multiple previously-scanned neighbours have the same color bucket, one of their labels is assigned to the current pixel, its component size is incremented by one (1), and the equivalencies of the multiple components are stored.

After scanning, connected components having different labels are "merged" if they have been noted as equivalent. That is, two components are merged if they are adjacent to one other and comprise pixels associated with the same color bucket. During merging, the respective sizes of the components are summed, and the pixels within the components are labelled with a common connected component label.

The color coherence vector is populated by, for each color bucket, calculating the number of incoherent pixels and the number of coherent pixels based on a comparison of component sizes with a coherency threshold size of 5 pixels.

Software pseudocode for determining the coherent and incoherent pixels, and for populating the color coherence vector, is shown in Appendix A. As will be noted, Appendix A includes three (3) procedures. Procedure getCoherenceVectors calls getNonReducedGraph and passes it a YIQ image that has been quantized such that each of its color components has eight (8) buckets of colors. Procedure getNonReducedGraph scans the YIQ image and assigns labels to the first row. This procedure also proceeds to scan pixels in subsequent rows of the YIQ image, determining matching color buckets, assigning labels to pixels, tracking the size of connected components and noting equivalencies. Procedure getNonReducedGraph calls setEquivalencies once the single scan has been completed in order to reconcile the equivalencies and assign labels as described above. Once this has been done, procedure getCoherenceVectors determines whether or not connected components have at least minComponentSize pixels, and populates the coherence vector accordingly. While minComponentSize is not explicitly been defined in the pseudocode itself, it is preferably set at five (5) pixels.

It can be seen that during population of the color coherence vector, labels are tracked for only one row of pixels at a time, and the size of different connected components is tracked during determination of the connected components. As such, only one pass through all pixels of the digital input image as described above is required in order to populate the color coherence vector.

The edge direction coherence vector (EDCV) is extracted from the Y-channel of each YIQ image in the set using the known non-maximum suppression technique. During the extraction, each pixel is compared to adjacent pixels, and an EDCV is populated based on the edge coherence of each pixel to its adjacent pixels. More particularly, the Y-channel is quantized into sixteen (16) buckets of edge directions, and one (1) bucket for non-edge pixels totalling seventeen (17) buckets. Connected component labels are assigned to pixels in the first row of the YIQ image based on the buckets with which they are associated (i.e., the bucket within which the edge direction of that pixel falls). Connected component labels are then assigned to pixels during a scan of subsequent rows based on respective edge direction connections to previously-scanned pixels. An edge direction connection is considered to occur when a pixel in the same bucket is adjacent to the current pixel. In the event that an edge direction connection is identified, the size of the respective connected component is increased by one (1). Otherwise, a new label is assigned to the current pixel and the component size for the new label is set at one (1). If only one (1) previously-scanned neighbour has the same edge direction bucket, its label is assigned to the current pixel and the component size is incremented by one (1). If multiple previously-scanned neighbours have the same edge direction bucket, one of their labels is assigned to the current pixel, its component size is incremented by one (1), and the equivalencies of the multiple components are stored. After scanning, connected components having different labels are "merged" if they have been noted as equivalents. That is, two components are merged if they are adjacent to one another and consist of pixels associated with the same edge direction bucket. During merging, the respective sizes of the components are summed, and the pixels within the components are labelled with a common connected component label.

The edge direction coherence vector (EDCV) is populated by, for each edge direction bucket, calculating the number of incoherent pixels and the number of coherent pixels based on a comparison of component sizes with a coherency threshold size of five (5) pixels. It can be seen that population of the EDCV is very similar to that of the CCV. The pseudocode of Appendix A modified to handle edge directions as opposed to colors can be used to compute the EDCV for the YIQ image.

Once the EDHs, CMs, CCVs and EDCVs have been extracted from the YIQ images in the set, they are provided to the low-level feature processing network 18 for determination of composite EDH-based, composite CM-based, composite CCV-based and composite EDCV-based orientation vectors.

In the low-level feature processing network 18, the EDHs are rotated using feature transformer 20 by each of 90, 180 and 270 degrees. As a result, after the rotations there are four (4) times as many EDHs. Rotation is conducted in order to take advantage of additional edge information available as a result of the standard non-maximum suppression algorithm used in edge detection on the digital input image for the different rotation angles. Rotation is conducted for the EDH feature (and EDCV feature as will be described) since rotation of CMs and CCVs does not yield any additional information.

Each of the EDHs is applied to the ANN 22, which in turn, for each input EDH, generates an output EDH-based orientation vector. The EDH-based orientation vectors are then applied to the summer 24. The summer 24 ensures that corresponding components of the EDH-based orientation vectors are summed. Table 1 below shows EDH-based orientation vectors generated by the low-level feature processing network 18 in response to various EDHs extracted from each of the four (4) YIQ images, and EDH feature rotation. All values represented by "a" in the orientation vectors of Table 1 are corresponding components and are therefore summed together. Similarly, all values represented by "b" are summed, all values represented by "c" are summed, and all values represented by "d" are summed.

TABLE 1

| YIQ Image Rotation | EDH Feature Rotation | Orientation Vector |
|---|---|---|
| 0 Degree | 0 Degree | $OV_{EDH\_0+0-}$ (a, b, c, d) |
|  | 90 Degree | $OV_{EDH\_+90} =$ (d, a, b, c) |
|  | 180 Degree | $OV_{EDH\_0+180-}$ (c, d, a, b) |
|  | 270 Degree | $OV_{EDH\_0+270-}$ (b, c, d, a) |
| 90 Degree | 0 Degree | $OV_{EDH\_90+0-}$ (d, a, b, c) |
|  | 90 Degree | $OV_{EDH\_90+90-}$ (c, d, a, b) |
|  | 180 Degree | $OV_{EDH\_90+180-}$ (b, c, d, a) |
|  | 270 Degree | $OV_{EDH\_90+270-}$ (a, b, c, d) |
| 180 Degree | 0 Degree | $OV_{EDH\_180+0-}$ (c, d, a, b) |
|  | 90 Degree | $OV_{EDH\_180+90-}$ (b, c, d, a) |
|  | 180 Degree | $OV_{EDH\_180+180-}$ (a, b, c, d) |
|  | 270 Degree | $OV_{EDH\_180+270-}$ (d, a, b, c) |
| 270 Degree | 0 Degree | $OV_{EDH\_270+0-}$ (b, c, d, a) |
|  | 90 Degree | $OV_{EDH\_270+90-}$ (a, b, c, d) |
|  | 180 Degree | $OV_{EDH\_270+180-}$ (d, a, b, c) |
|  | 270 Degree | $OV_{EDH\_270+270-}$ (c, d, a, b) |

Each of the CMs is applied to the ANN 28, which in turn, for each input CM, generates an output CM-based orientation vector. The CM-based orientation vectors output by the ANN 28 are then summed component-wise by summer 30 to result in the composite CM-based orientation vector 32.

Each of the CCVs is provided to the MOE 34 to provide, for each input CCV, an output CCV-based orientation vector. The resulting CCV-based orientation vectors output by the MOE 34 are then summed component-wise by summer 36 to result in the composite CCV-based orientation vector 38.

Each of the EDVCs are rotated by feature transformer 40 by each of 90, 180 and 270 degrees. As a result, after rotation there are four (4) times as many EDCVs. As described above, rotation is conducted in order to take advantage of additional edge information available as a result of the standard non-maximum suppression algorithm used in edge detection.

Each of the EDCVs is then applied to the MOE 42, which provides, for each input EDCV, an output EDCV-based orientation vector. The EDCV-based orientation vectors are then summed by summer 44 to result in a composite EDCV-based orientation vector 46. Like summing of EDH-based orientation vectors, summer 44 ensures that corresponding components of the EDCV-based orientation vectors are summed.

Each of the composite EDH-based orientation vectors, composite CM-based orientation vectors, composite CCV-based orientation vectors, composite EDCV-based orientation vectors and composite face-like features orientation vectors are then summed component-wise by orientation vector summer 50 to yield the resultant orientation vector 60 (step 400). Orientation of the digital input image is then determined by determining the direction that corresponds to the component in overall orientation vector 60 that has the highest value (step 500). For example, if overall orientation vector 60 $O_{OV}$= (5241, 9682, 230000, 1200), where the components represent 0, 90, 180 and 270 degrees respectively, then system 10 believes the top edge of the digital input image aligns with the 180 degree or South position because the South position corresponds to the component having the highest value (i.e., "230000"). Therefore, in order to correctly orient the digital input image, the digital input image should be rotated by 180 degrees so that its top edge is aligned with the 0 degree position.

The use of CCV and EDVC low level features during orientation determination provides statistically significant improvement in accuracy.

In the embodiment described above, reference is made to specific classifiers. Those of skill in the art will appreciate that alternative classifiers may be used provided that the various classifiers are diverse.

While a single-scan method for computing connected components has been described herein, alternatives methods for computing connected components may be used. For example, known prior art methods for computing connected components, whereby during a first scan through the digital image labels are assigned to pixels and labels are determined as equivalents based on common color, and whereby during a second scan, the pixels are re-labelled based on the noted equivalents, may be used. An example of such a two-scan algorithm for finding connected components is provided in "Connected Components Labelling," Fisher, S. Perkins, A. Walker, E. Wolfart, 2003 (http://homepages.inf.ed.ac.uk/rbf/HIPR2/label.htm; last accessed Aug. 16, 2007). However, as would be understood, the single-scan method has the advantage that, for an N×N pixel image, the memory size requirement for computing connected components is reduced from $O(N^2)$ to $O(N)$.

The method of automatically determining the orientation of a digital input image can be carried out via a software application including computer executable instructions executed by a processing unit such as a personal computer or other computing system environment. The software application may run as a stand-alone image orientation tool or may be incorporated into media management systems to provide enhanced functionality to those media management systems. The software application may comprise program modules including routines, programs, object components, data structures etc. and be embodied as computer readable program code stored on a computer readable medium. The computer readable medium is any data storage device that can store data, which can thereafter be read by a computer system. Examples of computer readable media include for example read-only memory, random-access memory, CD-ROMs, magnetic tape and optical data storage devices. The computer readable program code can also be distributed over a network including coupled computer systems so that the computer readable program code is stored and executed in a distributed fashion.

Although embodiments have been described, those of skill in the art will appreciate that variations and modifications may be made without departing from the spirit and scope thereof as defined by the appended claims.

APPENDIX A

PSEUDOCODE FOR POPULATING CCV

```
Procedure SetEquivalencies(c1, c2)
    Equivalencies[c1] := equivalencies[equivalencies[...[c1]]...]
    Equivalencies[c2] := equivalencies[equivalencies[...[c2]]...]
    If(equivalencies[c1] > equivalencies[c2])
        Equivalencies[c1] := equivalencies[c2]
        Equivalencies[equivalencies[c1]] := equivalencies[c2]
        ...
    else
        equivalencies[c2]:=equivalencies[c1]
        equivalencies[equivalencies[c2]]:=equivalencies[c1]
        ...
    endif
endprocedure
Procedure getNonReducedGraph(image)
    Equivalencies[ ] := {0,1,2,3,4, ...}
    PixelCount[ ] := {0, 0, 0, 0, 0, ...}
    NCurrentComponent = 0
    ComponentColors[nCurrentComponent] = color(row[1])
    PixelCount[nCurrentComponent]++
```

APPENDIX A-continued

PSEUDOCODE FOR POPULATING CCV

```
    Row := (first row of the image)
    for I := 2...length(Row)
        if(color(Row[i]) = color(Row[i−1])
            pixelCount[nCurrentComponents]++
            prevComponentRow[i] := nCurrentComponents
        else
            nCurrentComponent++;
            componentColors[nCurrentComponents] := color(Row[i])
            pixelCount[nCurrentComponents]++
            prevComponentRow[i] := nCurrentComponents
        endif
    endfor
    for j := 2...height(image)
        if(color(image(j,1) = color(image(j−1,1))
            curComponentRow[1] := prevComponentRow[1]
            pixelCount[curComponentRow[1]]++
        elseif(color(image(j,1) = color(image(j−1,2))
            curComponentRow[1] := prevComponentRow[2]
            pixelCount[curComponentRow[1]]++
        else
            nCurrentComponent++
            curComponentRow[1] := nCurrentComponent
            pixelCount[nCurrentComponent]++
        endif
        for i = 2...width(image)
            if(color(image(j,I) = color(image(j−1,i−1))
                curComponentRow[i] := prevComponentRow[i−1]
                pixelCount[curComponentRow[i]]++
                if(color(image(j−1, i−1)) = color(image(j−1,i+1))
                    setEquivalencies(prevComponentRow[i−1],
prevComponentRow[i+1])
                endif
            elseif(color(image(j,i)) = color(image(j−1,i))
                curComponentRow[i] := prevComponentRow[i]
                pixelCount[curComponentRow[i]]++
            elseif(color(image(j,i)) = color(image(j−1,i+1))
                curComponentRow[i] := prevComponentRow[i−1]
                pixelCount[curComponentRow[i]]++
                if(image(j, i) = image(j, i−1))
                    setEquivalencies(prevComponentRow[i+1],
curComponentRow[i−1])
                endif
            elseif(color(image(j, i)) = color(image(j, i−1))
                curComponentRow[i] := curComponentRow[i−1]
                pixelCount[curComponentRow[i]]++
            else
                nCurrentComponent++
                componentColors[nCurrentComponent] =
color(image(j, i))
                pixelCount[curComponentRow[i]]++
                curComponentRow[i] := nCurrentComponent
            endif
        endfor
        prevComponentRow := curComponentRow
    endfor
endprocedure
Procedure getCoherenceVectors
    getNonReducedGraph(image)
    coherenceVector = {0, 0, 0, ....}
    for i := nCurrentComponent...0
        if(equivalencies[i] < I)
            pixelCount[equivalencies[i]] :=
pixelCount[equivalencies[i]]+pixelCount[i]
            pixelCount[i] := 0
        endif
    endfor
    for i := 1...nCurrentComponent
        if(pixelCount[i] >= minComponentSize)
            coherenceVector[componentColors[i]] :=
coherenceVector[componentColor[i]]+pixelCount[i]
        endif
    endif
endprocedure
```
---------

What is claimed is:

1. A method of automatically determining orientation of a digital image comprising:

using a processor to:
extract features of the digital image; and
process the extracted features using diverse classifiers to determine orientation of the digital image based on the combined output of the diverse classifiers; and wherein
the extracted features comprise high level and low level features,
the low level features comprise at least two of color coherence vectors, color moments, edge direction histograms and edge direction coherence vectors, and
the high level features comprise face-like features; and
prior to the extracting, pre-processing said digital image, wherein pre-processing comprises:
converting the digital image to YIQ color space; and
creating a set of digital images that includes the converted digital image and copies of the converted digital image rotated by each of 90, 180 and 270 degrees; and
wherein the extracting comprises:
for each image in the set of digital images, comparing each pixel to adjacent pixels; and
populating a color coherence vector for each of the YIQ components of each digital image in the set based on the color coherence of each pixel to its adjacent pixels.

2. The method of claim 1 wherein said diverse classifiers comprise back-propagation neural network classifiers and mixture of experts network classifiers.

3. The method of claim 2 wherein the mixture of experts network classifiers comprise a gating network and a plurality of expert networks.

4. The method of claim 1, wherein each component of the YIQ color space is quantized into 8 buckets.

5. The method of claim 4, wherein a pixel is color coherent in respect of a color component if it is connected to at least five pixels in the same color bucket.

6. The method of claim 1, wherein the extracted features processing comprises:
processing the color coherence vectors using a mixture of experts network classifier to obtain a color coherence based orientation vector.

7. The method of claim 1, wherein the extracting comprises:
for each digital image in the set of digital images, comparing each pixel to adjacent pixels; and
populating edge direction coherence vectors for each digital image in the set of digital images based on the edge direction coherence of each pixel to its adjacent pixels.

8. The method of claim 7, wherein there are 17 edge direction bins, wherein 16 bins represent respective directions and 1 bin represents non-edge pixels.

9. The method of claim 7, wherein the extracting further comprises:
calculating, for each populated edge direction coherence vector, feature rotations of each of 90, 180 and 270 degrees.

10. The method of claim 9, wherein the extracted features processing comprises:
processing edge direction coherence vectors and feature rotated edge direction coherence vectors using a mixture of experts network classifier to obtain an edge direction coherence vector based orientation vector.

11. The method of claim 1, wherein the extracting further comprises:
dividing each digital image in the set of digital images into a plurality of equally-sized rectangular regions; and
extracting low level features from each of the regions.

12. The method of claim 11, wherein the extracting further comprises:
calculating mean and variance color moments for each color component in each region of each digital image in the set of digital images; and
normalizing the calculated color moments.

13. The method of claim 12, wherein the extracted features processing comprises:
processing the normalized color moments using a back-propagation neural network classifier to obtain a color moment based orientation vector.

14. The method of claim 11, wherein the extracting comprises: based on the Y channel of each digital image in the set of digital images, populating edge direction histograms for each region based on the detected edge orientation of each pixel in each region; and
calculating, for each populated edge direction histogram, feature rotations on the edge direction histograms by each of 90, 180 and 270 degrees.

15. The method of claim 14, wherein the processing comprises:
processing the edge direction histograms and feature rotated edge direction histograms using a back-propagation neural network classifier to obtain an edge direction histogram based orientation vector.

16. A system for automatically determining the orientation of a digital image comprising:
a feature extractor extracting features of the digital image; and
a processing network processing the extracted features using diverse classifiers to determine orientation of the digital image based on the combined output of the diverse classifiers; and wherein
the extracted features comprise high level and low level features,
the low level features comprise at least two of color coherence vectors, color moments, edge direction histograms and edge direction coherence vectors, and
the high level features comprise face-like features; and
a pre-processor converting the digital image to YIQ color space and creating a set of digital images that includes the converted digital image and the converted digital image rotated by each of 90, 180 and 270 degrees; and
wherein the feature extractor:
for each image in the set of digital images, compares each pixel to adjacent pixels; and
populates a color coherence vector for each of the YIQ components of each digital image in the set based on the color coherence of each pixel to its adjacent pixels.

17. The system of claim 16 wherein said processing network comprises back-propagation neural network classifiers and mixture of experts network classifiers.

18. The system of claim 17 wherein the mixture of experts network classifiers each comprise a gating network and a plurality of expert networks.

19. The system of claim 17, wherein the feature extractor extracts color coherence vectors from the digital image, and the processing network processes the color coherence vectors using a mixture of experts network classifier to produce a color coherence vector based orientation vector.

20. The system of claim 17, wherein the feature extractor extracts edge direction coherence vectors from the digital image, and the processing network processes the edge direction coherence vectors using a mixture of experts network classifier to produce an edge direction coherence vector based orientation vector.

21. The system of claim 17, wherein the feature extractor extracts color moment features from the digital image, and the processing network processes the color moment features using a back-propagation neural network classifier to produce a color moment based orientation vector.

22. The system of claim 17, wherein the feature extractor extracts edge direction histogram features from the digital image, and the processing network processes the edge direction histogram features using a back-propagation neural network classifier to produce an edge direction histogram based orientation vector.

23. The system of claim 16, comprising:
a face-like feature processor processing each digital image in the set to identify face-like features therein.

24. The system of claim 23, wherein the feature extractor extracts at least two of color moment features, edge direction histogram features, color coherence vector features and edge direction coherence vector features based on the digital image.

25. A tangible, non-transitory computer readable medium having a computer program thereon for automatically determining the orientation of a digital image, the computer program comprising:
computer program code extracting features of the digital image; and
computer program code processing the extracted features using diverse classifiers to determine orientation of the digital image based on the combined output of the diverse classifiers; and wherein
the extracted features comprise high level and low level features,
the low level features comprise at least two of color coherence vectors, color moments, edge direction histograms and edge direction coherence vectors, and
the high level features comprise face-like features; and
prior to the extracting, computer code pre-processing said digital image, wherein pre-processing comprises:
converting the digital image to YIQ color space; and
creating a set of digital images that includes the converted digital image and copies of the converted digital image rotated by each of 90, 180 and 270 degrees; and
wherein the extracting comprises:
for each image in the set of digital images, comparing each pixel to adjacent pixels; and
populating a color coherence vector for each of the YIQ components of each digital image in the set based on the color coherence of each pixel to its adjacent pixels.

* * * * *